US005471742A

United States Patent [19]

Darr

[11] Patent Number: 5,471,742

[45] Date of Patent: Dec. 5, 1995

[54] TOOLING AND PROCEDURE FOR THROTTLE PLATE ASSEMBLY

[75] Inventor: Kenneth E. Darr, Ann Arbor, Mich.

[73] Assignee: Ford Motor Company, Dearborn, Mich.

[21] Appl. No.: 300,618

[22] Filed: Sep. 2, 1994

[51] Int. Cl.$^{6}$ .................... B23P 15/00

[52] U.S. Cl. .................... 29/888.01; 29/464; 29/721

[58] Field of Search .................... 29/888.01, 428, 29/464, 466–468, 721; 123/337, 339

[56] References Cited

U.S. PATENT DOCUMENTS

| | | | |
|---|---|---|---|
| 1,385,467 | 7/1921 | Parsons . | |
| 3,299,502 | 1/1967 | Wanesky . | |
| 4,026,005 | 5/1977 | Washington | 29/464 |
| 4,438,745 | 3/1984 | Watanabe | 123/339 |
| 4,625,385 | 12/1986 | Kohler et al. | 29/467 |
| 4,628,581 | 12/1986 | Gjertsen et al. | 29/428 |
| 5,035,214 | 7/1991 | Daly et al. | 123/337 |

*Primary Examiner*—Irene Cuda

*Attorney, Agent, or Firm*—Jerome R. Drouillard; Roger L. May

[57] ABSTRACT

A tooling and procedure for installing a plurality of throttle plates onto a single throttle shaft all at the same time, using arbors/plungers secured to a tool holder, each of the arbors having a lower face surface with a suction provision for retaining a throttle plate against it for transport into one of several bores in a throttle body while allowing the throttle plates to be aligned with and attached to a flat on the throttle shaft. Limited lateral movement between the arbors/plungers provides for independent centering of each arbor/plunger relative to its bore, allowing simultaneous installation of a number of throttle plates.

6 Claims, 2 Drawing Sheets

TOOLING AND PROCEDURE FOR THROTTLE PLATE ASSEMBLY

FIELD OF THE INVENTION

This invention relates in general to an automotive type engine, and more particularly, to tooling and a procedure for simultaneously assembling a number of throttle plates to a single throttle shaft installed in an engine intake manifold/throttle body.

BACKGROUND OF THE INVENTION

In general, the procedure for assembling a bank of an engine intake manifold/throttle body is to install a single throttle shaft through the bank, with flats machined in the shaft to match the bores/induction passages. Each throttle plate is then separately inserted usually by hand through the bore to be attached to the throttle shaft. This is time consuming and costly and requires accurate alignment to assure centering of the plate to the shaft.

The invention not only simplifies this procedure by providing unique tooling, but also permits installation of a number of throttle plates at the same time while assuring centering of all of the plates simultaneously, as well as vertically locating the plates on the throttle shaft slabs/flats for subsequent attachment by a driver tool.

DESCRIPTION OF THE PRIOR ART

U.S. Pat. No. 4,628,581 Gjertsen et al, shows and describes an apparatus for preassembling a fuel system subassembly. It includes laterally spaced extension tubes 26, locating pins 78 insertable into the tubes, alignment pins 90 at the bottom of tubes 26, and a bearing plate 80 connecting the locating pins for concurrent downward movement to align the tubes with passages 38. Alignment pins 90 on an orientation plate 88 receive the lower end of tubes 26. No relative movement between pins is provided or permitted to compensate for misalignment of individual pins relative to others. This is provided for by the invention.

U.S. Pat. No. 3,299,502 Wanesky shows a can carrier 40 with locating pins 48 (extensions of legs 47) that are received by blind locating holes 38 of a work holder for alignment purposes when the carrier 40 is inverted and moved. Vacuum is used to hold and draw cans 20 down against header platforms 17.

U.S. Pat. No. 4,625,385 Kohler et al merely shows the use of alignment pins for connecting together and aligning two wheels of a tandem wheel assembly.

SUMMARY OF THE INVENTION

The induction passage portion of the intake manifold contains a line of machined bores or passages through which passes a single throttle plate shaft. The shaft has flats or slabs aligned with predetermined ones of the passages for attachment thereto and support of a throttle plate.

A tool holder has a number of arbors or plungers depending from it, with a flange at the top of each and a canted flat throttle plate retaining face on the bottom. Each face has alignment bosses extending downwardly from the face to mate with notches in the outer edge of a throttle plate. A suction port in the face applies vacuum to attract and retain a throttle plate against the face, permitting the tool/plungers and plate to be moved as a unit to a position over one of the induction passages. The passages center the plungers and the throttle plates, the underside of the plunger flange seating against the top of the manifold to vertically locate the throttle plates on the flats of the throttle shaft. Removal of the vacuum allows the plates to rest on the flats, whereupon a power driver inserted through the plunger body attaches the plates to the shaft.

The plungers are interconnected to allow a limited lateral relative movement between the plungers to compensate for any misalignment of any particular plunger with respect to a guide bore/induction passage during insertion.

It is a primary object of the invention, therefore, to provide compact and simplified tooling and a procedure for simultaneously installing a plurality of throttle plates onto a single throttle shaft of an automotive type engine intake manifold/throttle body, all accurately centered and vertically located with respect to the shaft for easy subsequent attachment thereto.

Other objects, features and advantages of the invention will become more apparent upon reference to the succeeding, detailed description thereof, and to the drawings illustrating the preferred embodiment thereof.

DESCRIPTION OF THE PREFERRED EMBODIMENT

Figure 1:
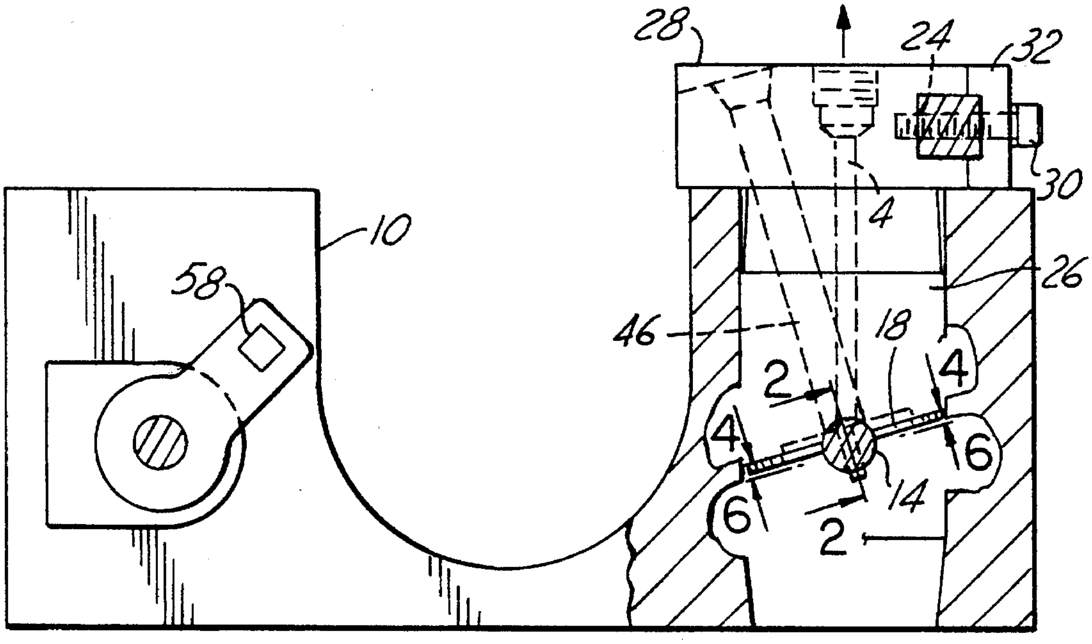
FIG. 1 is an end view of the lower portion of an engine intake manifold assembly.

FIG. 1 is an end elevational view of the two banks 10 of a six cylinder engine intake manifold/throttle body. In this particular case, the manifold is for a dual induction intake system, although it will be clear that it could be applied equally to a single intake passage system. Each cylinder in this case would have a pair of intake valves, not shown, supplied with air from two separated intake or induction passages. One such open ended passage is illustrated in FIG. 1 by the bore 12.

Figure 2:
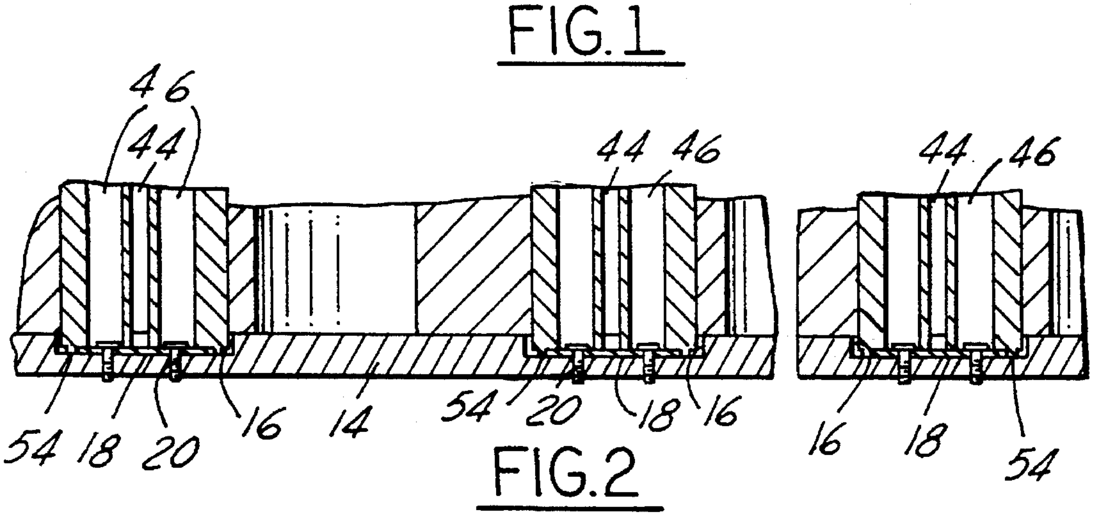
FIG. 2 is an enlarged cross-sectional view taken on a plane indicated by and viewed in the direction of the arrows II—II of FIG. 1.
Figure 5:
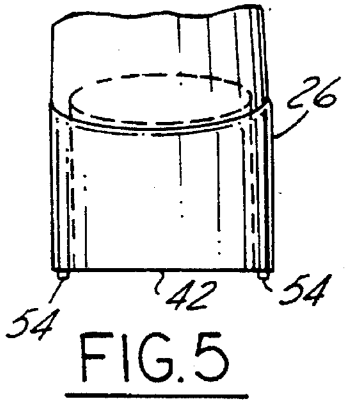
FIG. 5 is a perspective view of a detail.

In its assembled condition, the bore 12 contains one portion of a single throttle shaft 14 (see FIG. 2) that is rotatably mounted through the side walls of the manifold to pass laterally through all of the passages/bores. The shaft contains a number of axially or laterally spaced flat surfaces or slabs 16 against each of which is adapted to be seated a flat throttle plate 18.

Each plate is secured to the shaft by a pair of bolts screwed into appropriate threaded holes 20 in the flats. As will be noted, the flats align only with every other passage or bore, as in this particular case it is desired that only one of each pair of cylinder passages be closed at times. It will be clear, however, that all or any other combination of the passages could have throttle plates installed therein without departing from the scope of the invention.

As stated previously, the primary object is to provide tooling and a procedure to install a number of throttle plates through the passages/bores to the throttle shaft all at the same time, and yet vertically locate them with respect to the flats as well as assure centering of each of the plates for attachment for subsequent correct pivotal movement.

Figure 3:
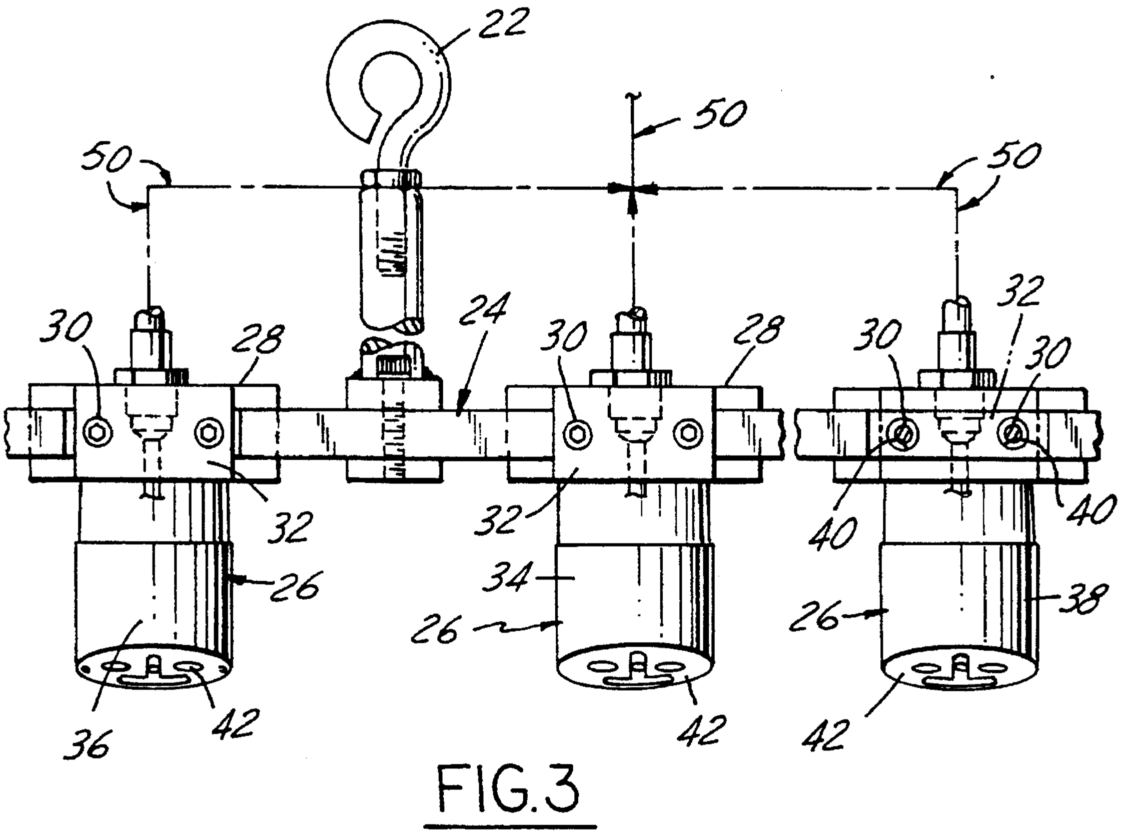
FIG. 3 is an elevational view, with parts broken away and in section, of the tooling embodying the invention.

FIG. 3 shows such a tooling. An eye bolt type lifting rod or lever 22 is securely fastened to a tool holder bar 24 that extends at right angles to the rod. Depending from the bar in this case are three laterally spaced, round, T-shaped or stepped diameter arbors or plungers 26, each with the lower major diameter only fractionally smaller than the diameter of the bore/passage 12.

At their upper flange-like ends 28, the arbors/plungers are secured to bar 24 by a pair of threaded bolts 30 (FIG. 1) passing through a retaining plate 32 and holes in the bar. One of the plungers 34 is fixedly secured, the others 36,38 are laterally adjustable, for independent vertical alignment purposes with respect to the induction passages. More specifically, plunger 38 is shown with the retaining plate cut away to indicate slightly larger diameter holes 40 in the bar 24 than the diameter of the bolts 30 that secure the plate to the plunger top 28. This permits the plunger and retaining plate to move laterally a slight distance, say 0.006 inches, for example, with respect to the other plungers in case of initial vertical misalignment of either of the plungers 36,38 with respect to the guide bore/passage 14 during insertion, as will become clearer later.

The lower end of each plunger has a canted flat face 42 (FIG. 4) with a vacuum or suction port 44 and a pair of through bores or holes 46. The holes extend vertically through the body of the plunger as seen in FIG. 1, and are power driver access holes for subsequently tightening the screws that secure the throttle plates to the throttle shaft. The holes 46 are spaced to align with the spacing of screw holes 48 in the throttle plate as well as those 20 of the throttle shaft.

The vacuum port 44 also extends vertically through the plunger body, and is adapted to be connected at its top by a vacuum line 50 to an on-off source of vacuum, not shown. A T-shaped groove 52 connected with the vacuum port 44 establishes a larger suction area over the face.

Figure 4:
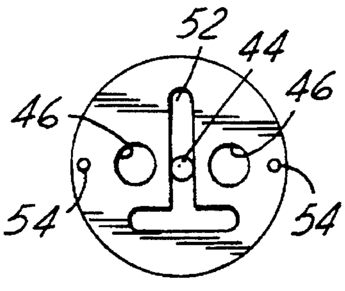
FIG. 4 is a cross-sectional view taken on a plane indicated by and viewed in the direction of arrows IV—IV of FIG. 1.
Figure 6:
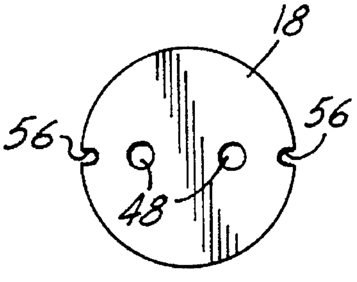
FIG. 6 is a view of a detail taken on a plane indicated by and viewed in the direction of arrows VI—VI of FIG. 1.

Spaced peripherally at the edge of the face 42 are a pair of diametrically opposed bosses 54 that depend from the face (see FIGS. 3 and 4). The bosses are for insertion through a mating pair of notches 56 cut into each throttle plate at its outer edge, as seen in FIG. 6, for radially aligning and centering the plate with respect to the plunger tool.

The throttle plate per se is a flat disc of only fractionally smaller diameter than the face 42, with the notches 56 and the pair of holes 48 through which screws are passed to secure the plate to the throttle shaft.

The procedure for assembling the throttle plates onto the throttle shaft is as follows. The empty bores or passages 12 are readied by first inserting the throttle shaft 14 lengthwise through the side of the manifold/throttle body with an actuating lever 58 on one end. An axial locating member, not shown, will align each of the flats accurately within each of the passages or bores in which a throttle plate is to be installed.

Next, the suction or vacuum port 44 is connected to vacuum, and a throttle plate 16 placed onto the face of each plunger by positioning the notches 56 over the bosses 54. The suction will retain the plates against the faces while the tool is being moved into position over the bores 12.

All of the plungers are then inserted simultaneously into the respective bores, as one is seen in FIG. 1, and lowered until the undersurface of the flange portion 28 of the plunger engages flat or flush against the top surface of the manifold 10. The undersurface in this case constitutes the reference surface for vertically locating the throttle plate on the throttle shaft flat.

The bore 12 in this case acts as a guide bore and is machined with a diameter only that much larger than that of the plunger lower major diameter to permit a sliding movement of the plunger with essentially no clearance between to thereby assure centering of the plunger and throttle plate with respect to the throttle shaft. The upper portion of the barrel of the plunger is tapered slightly to permit easy removal of the plunger.

The slight lateral movement built into the attachment to the holder bar of all but one of the plungers 34 permits a slight lateral adjustment of one or more of the other plungers to compensate for any slight misalignment of a plunger with respect to its bore 12 upon insertion of all of the plungers.

When the plungers 26 contact the top of the manifold, vacuum is released from the face 42, a power screw driver with screws attached is inserted through the openings 46, and the throttle plate is secured in place onto the shaft. The power driver is then removed, and the operation is complete.

From the foregoing, it will be seen that the invention provides a tooling and procedure for quickly and easily installing a plurality of throttle plates all at the same time to a single throttle shaft installed in an engine manifold/throttle body, and one that is time saving and economical cost-wise.

While the invention has been shown and described in its preferred embodiment, it will be clear to those skilled in the arts to which it pertains that many changes and modifications can be made thereto without departing from the scope of the invention.

I claim:

1. Tooling for independently locating and centering each of a plurality of throttle plates all at the same time to a single throttle shaft mounted within an engine intake manifold, comprising, a throttle body having a plurality of laterally spaced induction passages of a common bore open at their upper ends, a throttle shaft passing laterally through all of the induction passages, the shaft having a plurality of laterally spaced flat surfaces facing the open end of the passages each separately aligned with and centered with respect to one of the passages for the reception thereagainst of a throttle plate, and tooling means for simultaneously locating and centering a plurality of the plates all at the same time to the throttle valve flats through each of the open ends of the passages for assembly of the plates to the flats, the tooling means including a tool holder having a plurality of laterally spaced plungers depending therefrom, the plungers being T-shaped in cross-section with a flange seating surface at its upper end and a flat throttle plate holding face at its opposite end, the latter face having a suction aperture therein adapted to be selectively connected to or disconnected from a vacuum supply, the face having a plurality of peripherally located and spaced bosses projecting therefrom, a plurality of flat throttle plates having peripheral notches in the edges thereof corresponding in number to and adapted to be aligned with the bosses on the plunger face for contiguous engagement of a separate plate to each one of the faces upon application of suction to the plates, the plungers having an outside diameter fractionally smaller than the guide bores with only sufficient clearance therebetween to permit a vertical slidable movement of the plungers without lateral movement thereof for slidably centering the plunger and plate with respect to each bore, and fractionally larger than the diameter of the throttle valve plates to provide a fractional clearance between the plate and bore, the upper flange of the plungers seating against the upper face of the throttle body to vertically locate the plates on the flats of the throttle valve shaft for subsequent attachment thereto.

2. Tooling for independently locating and centering each of a plurality of throttle plates all at the same time to a single throttle shaft mounted within an engine intake manifold, comprising, a manifold having a number of separate laterally spaced open ended throttle bores, a throttle shaft extending laterally through all of the bores and having a flat surface aligned with each of the bores for reception of a throttle plate thereagainst, the tooling including a tool holder having a number of laterally spaced plungers depending therefrom spaced laterally a distance essentially the same as that of the bores, the bores constituting a guide bore of only slightly larger diameter than the plunger for centering the tool plungers therewithin, each plunger having a flat surface and a suction port at its lower end for retaining a flat throttle plate thereagainst upon application of vacuum to a throttle plate, a flange on the upper end of each plunger adapted to seat against the manifold upon insertion of the plunger into the guide bore to axially/vertically locate each throttle plate against a throttle shaft flat.

3. A tooling as in claim 2, wherein the plungers each are of a stepped diameter with the larger diameter having an under surface constituting a seat for a flush engagement with an upper surface of the manifold for vertically locating the plunger with respect to the guide bore upon insertion of the plunger into the bore.

4. A tooling as in claim 2, each plunger lower flat face having a number of bosses projecting downwardly therefrom and peripherally located around the outer edge of the surface, each throttle plate having notches peripherally located at its edge for alignment with and receipt of the bosses therein upon application of vacuum to the plates from the plunger port for subsequent alignment of the plates with the throttle shaft flat surface upon insertion of each plunger into the guide bores.

5. A tooling as in claim 2, including means operatively connecting the plungers to each other and to the tool holder permitting a limited lateral movement of the plunger relative to each other to compensate for initial misalignment of a plunger with respect to its receiving bore thereby establishing independent centering of each plunger in its respective bore.

6. A tooling as in claim 4, each throttle shaft flat having a number of fastener apertures for attachment of a throttle plate thereto, each throttle plate having a corresponding number and location of fastener apertures for alignment with the shaft flat apertures upon engagement of the bosses in the notches thereby permitting attachment of the plates to the flat shaft surfaces by the passing of fasteners through the aligned apertures.

* * * * *